United States Patent
Bugenhagen

(10) Patent No.: US 7,742,413 B1
(45) Date of Patent: Jun. 22, 2010

(54) UTILIZING A NULL JITTER BUFFER TO MONITOR SESSION TRAFFIC

(75) Inventor: Michael K. Bugenhagen, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 595 days.

(21) Appl. No.: 11/345,419

(22) Filed: Feb. 1, 2006

(51) Int. Cl.
*H04L 12/54* (2006.01)

(52) U.S. Cl. .............. 370/231; 370/235; 370/252; 370/428

(58) Field of Classification Search ......... 370/412–418, 370/389, 395.21, 229, 352–356, 395.61, 370/230, 230.1, 231, 235, 428, 516, 252; 709/231, 232

See application file for complete search history.

(56) References Cited

U.S. PATENT DOCUMENTS

| | | | |
|---|---|---|---|
| 6,360,271 B1* | 3/2002 | Schuster et al. ............ 709/231 |
| 6,418,125 B1 | 7/2002 | Oran | |
| 6,452,950 B1* | 9/2002 | Ohlsson et al. ............ 370/516 |
| 6,504,838 B1 | 1/2003 | Kwan | |
| 6,658,027 B1* | 12/2003 | Kramer et al. ............. 370/516 |
| 6,684,273 B2 | 1/2004 | Boulandet et al. | |
| 6,700,895 B1* | 3/2004 | Kroll ....................... 370/412 |
| 6,744,768 B2* | 6/2004 | Vikberg et al. ......... 370/395.21 |
| 6,747,999 B1 | 6/2004 | Grosberg et al. | |
| 6,757,284 B1* | 6/2004 | Galles ...................... 370/394 |
| 6,765,931 B1 | 7/2004 | Rabenko et al. | |
| 6,788,651 B1 | 9/2004 | Brent et al. | |
| 6,862,298 B1 | 3/2005 | Smith et al. | |
| 6,934,258 B1* | 8/2005 | Smith et al. .............. 370/238 |
| 6,977,942 B2* | 12/2005 | Raisanen ................... 370/429 |
| 6,988,169 B2* | 1/2006 | Burger et al. ............. 711/137 |
| 7,088,677 B1* | 8/2006 | Burst, Jr. .................. 370/229 |
| 7,099,820 B1* | 8/2006 | Huart et al. .............. 704/207 |
| 7,477,661 B2* | 1/2009 | Scott ....................... 370/516 |
| 7,496,086 B2* | 2/2009 | Eckberg ................... 370/352 |
| 2002/0101885 A1* | 8/2002 | Pogrebinsky et al. ...... 370/516 |
| 2002/0167911 A1* | 11/2002 | Hickey .................... 370/252 |
| 2003/0026275 A1* | 2/2003 | Lanzafame et al. ........ 370/412 |
| 2003/0120789 A1* | 6/2003 | Hepworth et al. ......... 709/230 |
| 2004/0073641 A1* | 4/2004 | Minhazuddin et al. ..... 709/223 |
| 2005/0007952 A1* | 1/2005 | Scott ....................... 370/229 |
| 2006/0062216 A1* | 3/2006 | Li et al. ................... 370/389 |

OTHER PUBLICATIONS

Introduction to Circuit Emulation Services over Ethernet The Metro Ethernet Forum 2004.; http://www.metroethernetforum.org, pp. 1-6.
Peter Meyer, "Circuit Emulation Services-over-Packet and Cellular Backhaul," as published in analog Zone; Zarlink Semiconductor Packet Processing, pp. 1-6.
U.S. Appl. No. 11/073,200, filed Mar. 4, 2005.
U.S. Appl. No. 11/115,490, filed Apr. 27, 2005.
U.S. Appl. No. 11/126,566, filed May 11, 2005.
U.S. Appl. No. 11/188,557, filed Jul. 25, 2005.

* cited by examiner

*Primary Examiner*—Pankaj Kumar
*Assistant Examiner*—Duc T Duong

(57) ABSTRACT

A null jitter buffer provides performance and diagnostic information relating to a communications network topology. A method is provided for receiving session traffic having an origin and a destination, multicasting the session traffic to the destination and to a null jitter buffer, receiving session traffic in the null jitter buffer, buffering the session traffic in the null jitter buffer, and analyzing performance metrics of the null jitter buffer.

16 Claims, 5 Drawing Sheets

UTILIZING A NULL JITTER BUFFER TO MONITOR SESSION TRAFFIC

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to traffic monitoring in packet networks, and in particular, to utilizing a null-jitter buffer to monitor session traffic.

2. Description of the Prior Art

Jitter buffers are commonly located at the end points of packet communication paths used for real-time communications on a packet-switched network. In a packet-switched network, units of data called packets are routed through the network based on an address value associated with each packet or each group of packets. This allows network paths to be shared by a plurality of users. The internet is an example of a packet-switched network.

Jitter buffers are typically used to improve the quality of real-time applications by buffering input so that packets may be presented to the user in a substantially contiguous and continuous manner. Jitter buffers may be static or dynamic. Static jitter buffers are configured with a particular size that does not change during operation. When a static jitter buffer becomes congested, packets are simply dropped. In contrast, dynamic jitter buffers can be automatically reconfigured to accommodate higher traffic patterns. Dynamic jitter buffers are sometimes referred to as adaptive jitter buffers.

FIG. 1 illustrates a network topology representative of the prior art, wherein a jitter buffer 104 is interposed between two network elements 102 and 106 (the buffer can be at any point in the flow, and can be directionally dependant). Network elements 102 and 106 may be computers or other devices, or entire networks, or a combination thereof. Data traveling between network element 102 and network element 106 must always pass through jitter buffer 104. In some cases, data may not be sent from one network element to the other until a substantial portion of a set of packets have been received by jitter buffer 104. As such, the use of jitter buffer 104 delays traffic between network elements 102 and 106.

A communication service provider provides communications services to customers. For example, Sprint Corporation provides telephony and Internet services to many businesses. The $3^{rd}$ party communications network between the service provider and the customer are referred to as access or the access provider. Sometimes, the service provider also provides the access for the communication services, and thus, the service provider is also the access provider. For example, Sprint Corporation may provide wireless access between the customer and Sprint's service systems that provide the Internet and telephony services. Other times, the service provider does not provide the access, and instead, a separate access provider provides the access between the customer and the service provider. For example, a cable television company may provide the access between customers and Sprint, where Sprint provides the customer with Internet and telephony services over the access provided by the cable television company. This situation appears to be expanding as a growing number of companies are providing access and a growing number of other companies are providing communication services. Tracking the quality of service delivered by a communication service provider, and that delivered by separate access providers has therefore become crucial.

Quality issues in a packet network, such as dropped or delayed packets, can be especially vexing in the context of a real-time application, since the problems can usually be mitigated, but not eliminated. Further, the problems are often transient; one flow may have serious quality issues while another has none. It can thus be difficult to determine the location of flow problems in a packet network. This is especially true when multiple networks are linked together. Poor reception on a session initiation protocol (SIP) enabled phone may be on the sender's network, the recipient's network, or any of the networks in between. Further, the user may have a service guarantee which promises a specified minimum level of performance. When this minimum level of performance is not met, it remains difficult to test service paths and determine which service provider should be held responsible for affecting repairs, and/or held responsible for flow quality issues. Until now, service providers had to use testing methods with slowed traffic down, were intrusive, complex to implement, and often required service technicians to be present at the physical location of the resource being tested.

SUMMARY OF THE INVENTION

An embodiment of the invention helps solve the above problems and other problems by providing a method for tracking communication network traffic according to one embodiment of the invention. In an embodiment of the invention, a null jitter provides performance and diagnostic information relating to a communications network topology. A method is provided for receiving session traffic having an origin and a destination, multicasting the session traffic to the destination and to a null jitter buffer, receiving session traffic in the null jitter buffer, buffering the session traffic in the null-jitter buffer, and analyzing performance metrics of the null jitter buffer.

BRIEF DESCRIPTION OF THE DRAWINGS

The same reference number represents the same element on all drawings.

DETAILED DESCRIPTION OF THE PREFERRED EMBODIMENT

FIGS. 2-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

A null jitter buffer is a buffer connected in parallel with a network connection, such that traffic may be multicast both to the intended recipient, and to the null jitter buffer. Traffic need not flow through the null jitter buffer to reach the intended recipient. Through the use of one or more null jitter buffers, quality can be monitored at the borders of a network, and/or at points throughout the network. A problem causing dropped or delayed packets may therefore be quickly and efficiently located. Similarly, a null jitter buffer may be used to obtain historical flow data for network management and troubleshooting. A null jitter buffer also allows the isolation of specific IP flows on a network such that the location of flow problems can be easily determined. See the discussion below, in conjunction with FIG. 2, for further details on the implementation of null jitter buffers.

Figure 1:
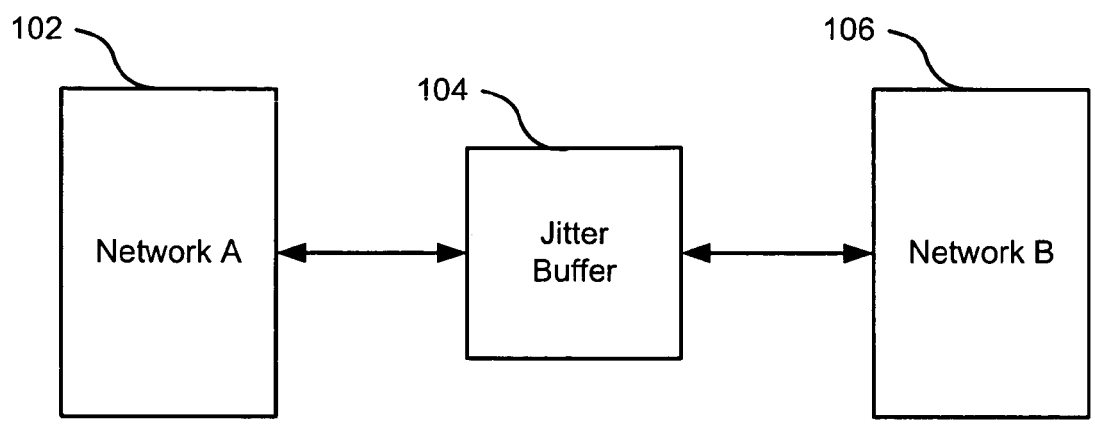
FIG. 1 illustrates a network topology containing a jitter buffer and represents the prior art.
Figure 2:
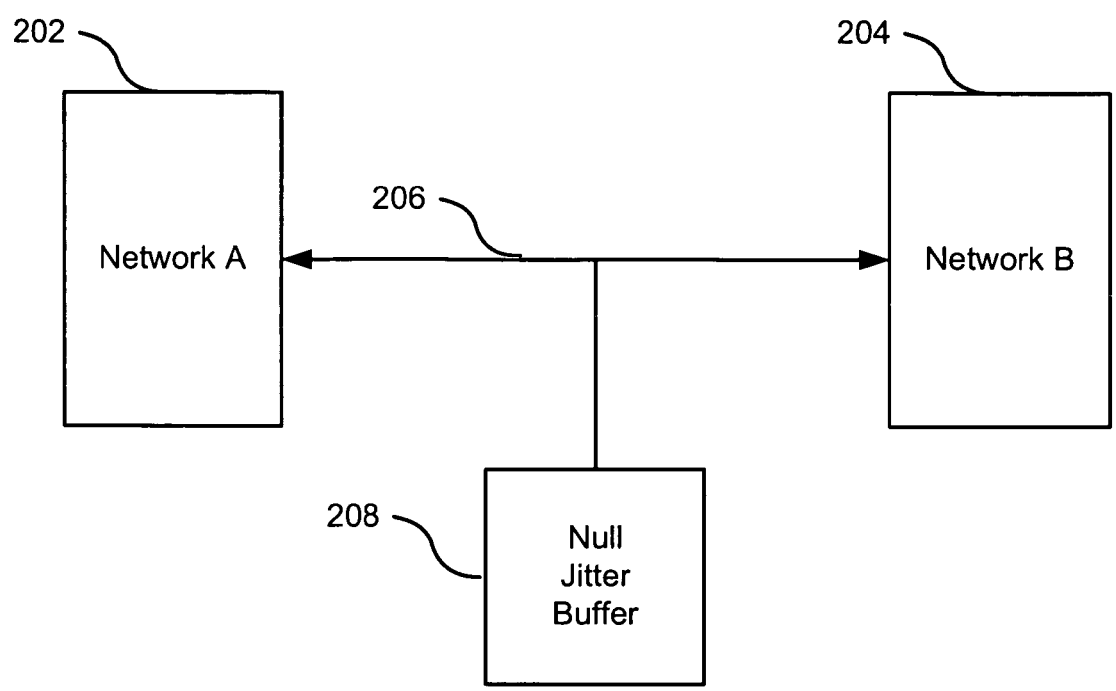
FIG. 2 illustrates a network topology containing a null jitter buffer.

FIG. 2 illustrates a network topology wherein a null jitter buffer is implemented in accordance with one embodiment of the claimed invention. Network elements 202 and 204 are communication networks which may include one or more intranets, the Internet, or a combination thereof. Data traveling between network element 202 and network element 204 travels on network connection 206, where network connection 206 may range from a portion of an individual network connection, to a large group of network connections. In an embodiment, network connection 206 is a single flow on a network path capable of transmitting a plurality of flows. In still another embodiment, network connection 206 comprises all the flows belonging to a specific customer on a network path capable of transmitting a plurality of flows. Network connection 206 branches to null jitter buffer 208 such that traffic traveling on network connection 206 is observable by null jitter buffer 208. Since null jitter buffer 208 need not be interposed between network element 202 and network element 204, traffic between the two network elements 202 and 204 need not be delayed or otherwise directly affected by null jitter buffer 206.

Several dimensions of network performance and jitter can be tracked using one or more null jitter buffers; these are discussed below in conjunction with FIGS. 4 and 5. In an embodiment, a null jitter buffer is placed near a gateway between a local service provider's network and a separate service provider's network, such that quality levels may be differentiated between the two providers' networks.

In an embodiment, null jitter buffer 208 is placed on a border between a first network run by a first service provider, and a second network run by a second service provider. Because of its positioning, null jitter buffer 208 can be used to determine whether a given quality issue was passed on to the second network by the first network (and thus, responsibility for addressing the problem lies with the first service provider).

Alternatively, if no substantial issues are observed by null jitter buffer 208, then it may be assumed that any quality issues originate within the second network, and thus are the responsibility of the second service provider.

Figure 3:
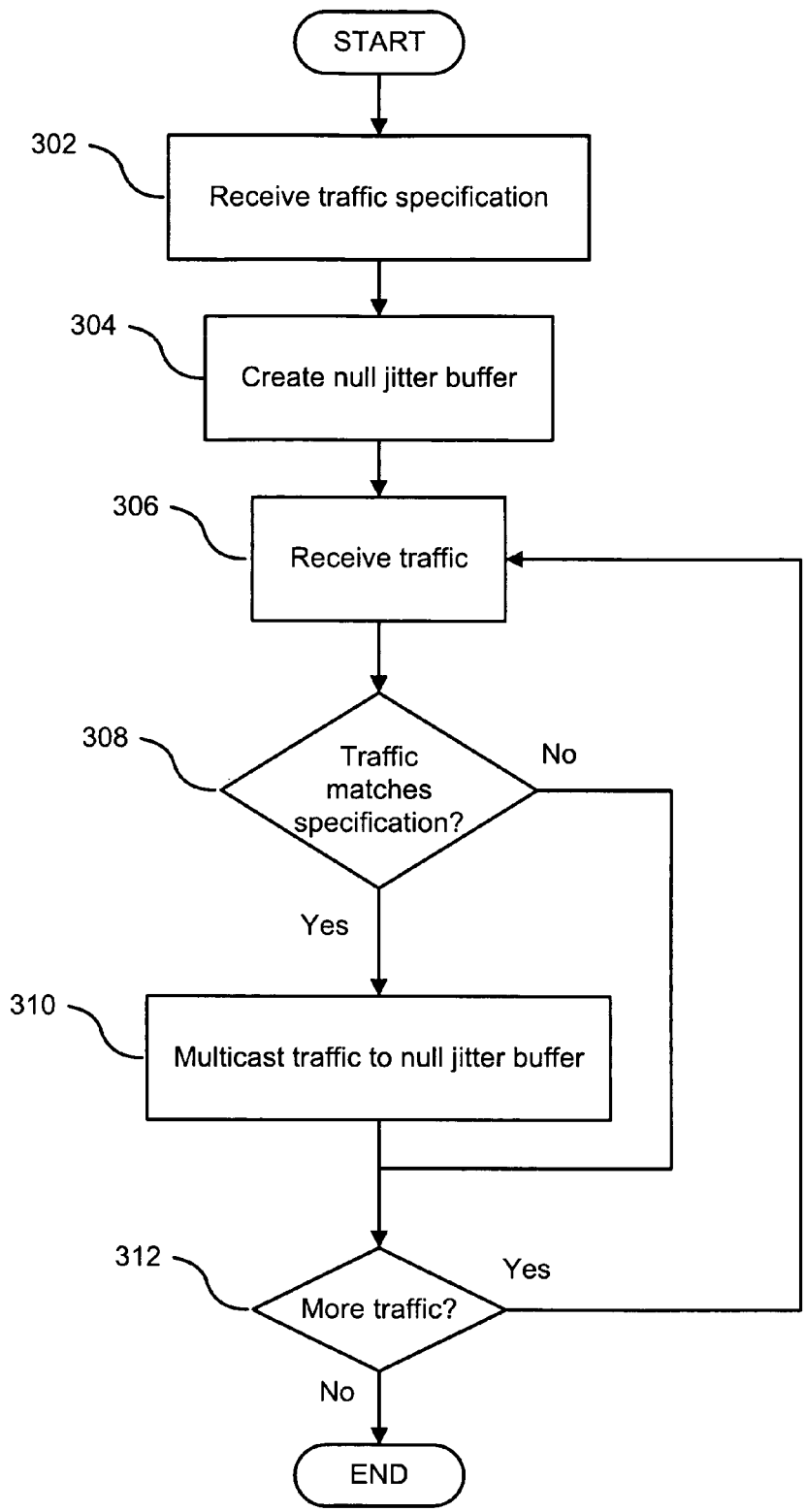
FIG. 3 illustrates the operational flow of the operations performed in accordance with one embodiment of the present invention, in which a null buffer is implemented and used.

FIG. 3 illustrates an operational flow of the operations performed in accordance with one embodiment of the claimed invention. First, receive operation 302 receives a traffic specification. The traffic specification specifies which traffic should be multicast to the null jitter buffer. The traffic specification may identify packets with certain, specific characteristics, such as packets with a particular sender, packets with a particular recipient, packets with content of a particular type, or packets with other identifiable characteristics. In an alternate embodiment, the traffic specification specifies that all traffic should be multicast to a null jitter buffer, regardless of any specific packet characteristics. The traffic specification may be received from a user, or an automated agent such as a computer program.

Create operation 304 creates a null jitter buffer. In an embodiment, the null jitter buffer is a network interface with a physical memory capable of storing packets. In an alternate embodiment, the null jitter buffer is a data structure on the memory of a computer being used to analyze traffic. In one embodiment, the null jitter buffer is large (e.g., 50 milliseconds or more) so as to accommodate a large number of packets.

Receive operation 306 receives network traffic. Determine operation 308 determines whether the network traffic characteristics match the traffic specification received by receive operation 302. In an embodiment, network traffic matches the traffic specification when the characteristics of a packet match those in the traffic specification. For example, if the network specification specifies a certain destination IP address, and a packet's destination IP address is the same, then a match is found. If a match is found, flow branches YES to multicast operation 310. However, if the network traffic does not match the traffic specification, flow branches NO to determine operation 312.

Multicast operation 310 multicasts the traffic received by receive operation 306 traffic to the null jitter buffer. Traffic that is multicast is sent to a plurality of recipients. In this case, the traffic is multicast to its original destination(s), as well as the null jitter buffer.

In an embodiment, the packet arrival date and packet size is checked for each packet that is multicast to the null jitter buffer. Based on how large the packets are ("packet size"), on how fast the buffer fills up ("fill rate"), and on the speed with which packets are being delivered ("port speed"), a "play rate" (a measure of play quality of the information carried by the packets) can be determined at the point in the network where the null jitter buffer connects.

In an embodiment, the traffic multicast to the null jitter buffer may be used to track jitter over time for a given session or group of sessions, for a given IP address or group of IP addresses, or for packets with a given timestamp. In an embodiment, this information is logged for later inspection by a network administrator.

Determine operation 312 determines whether additional network traffic is expected, or if additional network traffic is required for performance analysis purposes. If additional network traffic is expected or required, flow branches YES to receive operation 306. Otherwise, flow branches NO to the end of the operational flow.

Figure 4:
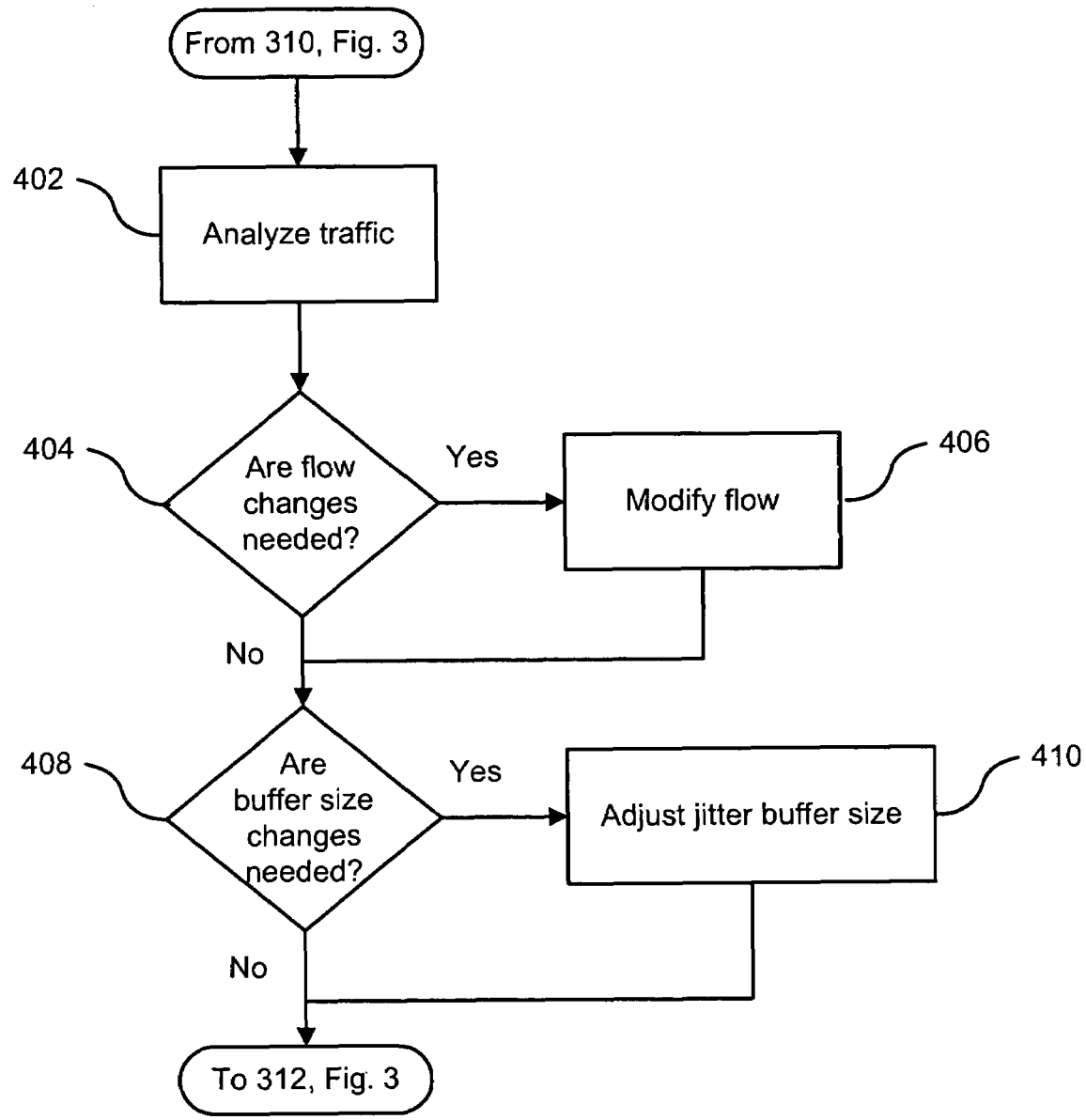
FIG. 4 illustrates the operational flow of the operations performed in accordance with one embodiment of the present invention, in which traffic is analyzed to tune a non-null jitter buffer and/or to adjust network flow.

FIG. 4 illustrates an operational flow of the operations performed in accordance with an embodiment of the claimed invention, in which traffic multicast to a null jitter buffer is analyzed, and the network topology and other non-null jitter buffer(s) are adjusted accordingly. Flow proceeds from multicast operation 310 (FIG. 3) to analyze operation 402. Analyze operation 402 analyzes the network traffic multicast to the null jitter buffer. In an embodiment the analyze operation 402 uses multiple threshold levels to evaluate flow characteristics and report and log the performance classification of the flows. In an embodiment, the packet arrival date and packet size is checked for each packet that is multicast to the null jitter buffer. Based on how large the packets are, and how fast the buffer fills up, the efficiency with which packets are being delivered via the various paths between the source and the null jitter buffer can be determined.

Likewise, based on traffic analysis performed by analyze operation 402, it may be determined that a larger jitter buffer is necessary because packets are taking too long to arrive. Conversely, it may determine that a smaller jitter buffer would be optimal since packets are arriving quickly enough that a large jitter buffer (and its associated large latency) are not necessary.

Determine operation 404 determines whether any flow changes are needed based on the traffic efficiency observed by analyze operation 402. In an embodiment, a large number of slow packets are identified as traveling via a single, problematic part of the network, and a determination is made that flow changes are needed. In another embodiment, a null jitter buffer may coordinate with other null jitter buffers upstream or downstream from the instant null jitter buffer to triangulate the physical location of a network problem which is causing traffic quality issues. If flow changes are needed, flow branches YES to modify operation 406. Otherwise, flow branches NO to determine operation 408.

Modify operation 406 reroutes flow to avoid the problematic part of the network. In an embodiment, a null jitter buffer passes reports of problematic flow to a network manager which redirects flow around the problem area, and/or dispatches personnel to remedy the problem. In another embodiment, a null jitter buffer can pass on additional information about the location of a problem as determined by coordinating with other null jitter buffers.

Determine operation 408 determines, based on the network traffic analysis performed by analyze operation 402, whether any jitter buffers need a size adjustment. In an embodiment, determine operation 408 determines that a larger jitter buffer is necessary because packets are taking too long to arrive. In an alternate embodiment, determine operation 408 determines that a smaller jitter buffer would be optimal since packets are arriving quickly enough that a large jitter buffer (and its associated large latency) are not necessary. If determine operation 408 determines that one or more jitter buffers require a size adjustment, flow branches YES to adjust operation 410, which makes the corresponding adjustment(s). However, if determine operation 408 determines that all jitter buffers are already optimally sized, flow branches NO to determine operation 312 (FIG. 3).

In an embodiment, determine operation 408 occurs before determine operation 404. In another embodiment, determine operation 408 occurs substantially simultaneously with determine operation 404.

Figure 5:
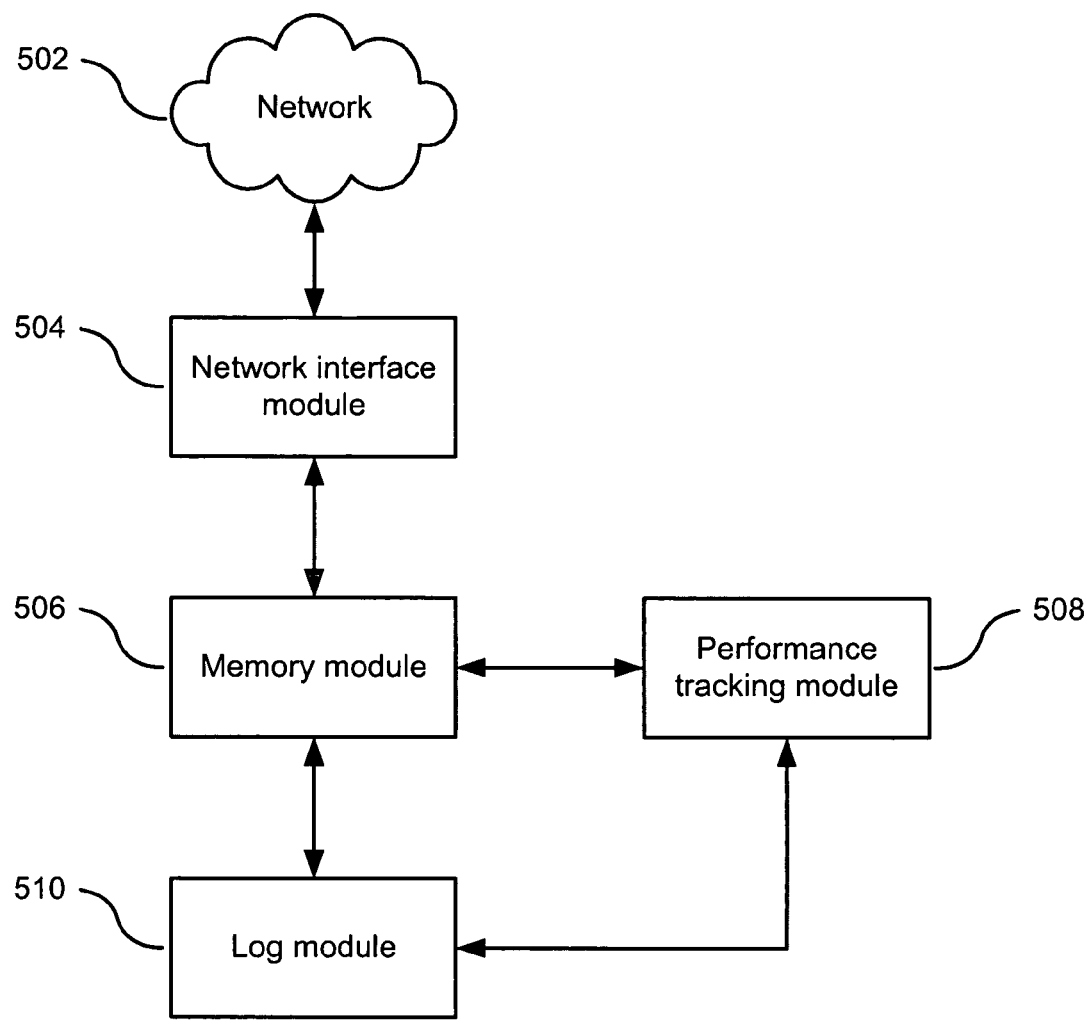
FIG. 5 is a block diagram illustrating the modules that comprise one embodiment of the present invention.

FIG. 5 is a block diagram illustrating the modules that comprise one embodiment of the present invention. Network 502 is a computer network using IP or a similar protocol. Network 502 may be a local area network, an intranet, the Internet, or other type of network. Network interface module 504 serves as an interface between memory module 506 and network 502. Network interface module 504 receives packets multicast across network 502. Network interface module 504 may also send performance data gathered by performance tracking module 508 (discussed below) to a system administrator, or to one or more sites on network 502 or connected thereto. In an embodiment, network interface module 504 is a network adapter in a computer system.

Memory module 506 is a physical memory capable of storing and retrieving packet data received via network interface module 504. Memory module 506 may also store performance data computed by performance tracking module 508 (discussed below) and/or log module 510 (discussed below). In another embodiment, memory module 506 is a non-transitory volatile or non-volatile memory of a computer system, or a data structure stored on said memory. Memory module can stores packet and performance data until it is no longer needed by any other modules, or until additional memory space is needed.

Performance tracking module 508 tracks performance of network traffic via the packets stored in memory module 506. Based on how large the packets are ("packet size"), on how fast the buffer fills up ("fill rate"), and on the speed with which packets are being delivered ("port speed"), play quality of the information carried by the packets can be determined. In an embodiment, performance tracking module 508 can also track jitter over time for a given session or group of sessions, for a given IP address or group of IP addresses, or for packets with a given timestamp. In another embodiment, performance tracking module 508 coordinates with performance tracking modules in other null jitter buffers (not pictured) to help triangulate a problem area of the network. Performance tracking module 508 may send performance data to a system administrator or entity in charge of a given area of the network via network interface module 504.

Log module 510 logs packet information and performance data for later inspection by a network administrator. In an embodiment, log module 510 simply flags existing performance and packet data stored in memory module 504 to be retained for use by log module 510 even when no other modules require said data. Log module 510 and performance tracking module 508 may work in conjunction to track performance data versus time. As a result, patterns associated with transient network problems can be identified, as can trends pertaining to traffic and/or jitter rates.

A variety of changes can be made to the claimed invention without departing from the scope of the invention: Further, it is envisioned that the claimed invention may be implemented in conjunction with a wide variety of applications, including but not limited to, media gateways, video IP systems, voice-over-IP including SIP phones, fax-over-IP, real-time IP gateways, and combinations thereof. It is further envisioned that the claimed invention may be implemented in both physically connected networks and wireless networks.

The various embodiments described above are provided by way of illustration only and should not be construed to limit the invention. For the purpose of teaching inventive principles, some conventional aspects have been simplified or omitted. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for tracking communication network traffic within a communication network comprising a first network run by a first service provider and a second network run by a second service provider, the method comprising the steps of:
  receiving session traffic having an origin and a destination;
  multicasting the session traffic to the destination and to a null jitter buffer;
  receiving the session traffic in the null jitter buffer;
  buffering the session traffic in the null jitter buffer;
  analyzing performance metrics of the session traffic in the null jitter buffer to evaluate flow characteristics;

determining that a size of a jitter buffer in the communication network should be adjusted based on the flow characteristics of the session traffic received in the null jitter buffer;

determining, based on the flow characteristics, whether dropped packets are dropped from the first network run by the first service provider or the second network run by the second service provider and determining the physical location of a network problem that is causing the dropped packets; and adjusting the size of the jitter buffer based on the flow characteristics.

2. The method of claim 1 further comprising determining that a path for the session traffic should be rerouted based on the performance metrics.

3. The method of claim 2 further comprising rerouting the path for the session traffic.

4. The method of claim 1 further comprising receiving a traffic specification specifying which traffic of the session traffic is to be multicast to the null jitter buffer.

5. The method of claim 4 further comprising creating the null jitter buffer.

6. The method of claim 1 further comprising determining that one or more additional jitter buffers are needed.

7. The method of claim 1 wherein the session traffic is only multicast to the null jitter buffer when the session traffic matches a traffic specification.

8. A monitoring network for tracking communication network traffic within a communication network comprising a first network run by a first service provider and a second network run by a second service provider, the monitoring network comprising:

a network configured to receive session traffic having an origin and a destination and multicast the session traffic to the destination and to a network interface module;

the network interface module configured to receive the session traffic from the network and transfer the session traffic to a null jitter buffer;

a null jitter buffer configured to receive and buffer the session traffic; and a performance tracking module configured to analyze performance metrics of the session traffic in the null jitter buffer to evaluate traffic flow characteristics, determine that a size of a jitter buffer in the communication network needs to be adjusted based on the flow characteristics, determine, based on the flow characteristics, whether dropped packets are dropped from the first network run by the first service provider or the second network run by the second service provider and determine the physical location of a network problem that is causing the quality issue; and to communicate with a system administrator via the network interface module to adjust the size of the jitter buffer based on the flow characteristics.

9. The monitoring network of claim 8, wherein the performance tracking module is further configured to determine that a network flow should be rerouted based on the performance metrics.

10. The monitoring network of claim 9, wherein the performance tracking module is further configured to send performance data to the system administrator via the network interface module regarding rerouting the network flow.

11. The monitoring network of claim 8, wherein the performance tracking module is further configured to coordinate with other null jitter buffers in the network in order to triangulate problem areas of the network.

12. The monitoring network of claim 8, wherein the network is configured to adjust the size of the jitter buffer.

13. The monitoring network of claim 8, wherein the performance tracking module is further configured to determine that one or more additional jitter buffers are needed.

14. The monitoring network of claim 13, wherein the network is further configured to create the one or more additional jitter buffers.

15. The monitoring network of claim 8, wherein the network is further configured to only multicast session traffic to the null jitter buffer when the session traffic matches a traffic specification.

16. A non-transitory computer-readable storage medium with an executable program stored thereon for tracking communication network traffic within a communication network comprising a first network run by a first service provider and a second network run by a second service provider, wherein the program instructs a tracking module to perform the following steps:

receive session traffic having an origin and a destination, multicast the session traffic to the destination and to a null jitter buffer, receive session traffic in the null jitter buffer, buffer the session traffic in the null jitter buffer, analyze performance metrics of the session traffic in the null jitter buffer to evaluate traffic flow characteristics, determine, based on the flow characteristics, whether dropped packets are dropped from the first network run by the first service provider or the second network run by the second service provider and determine the physical location of a network problem that is causing the quality issue; determine that a size of a jitter buffer in the communication network should be adjusted based on the flow characteristics of the session traffic in the null jitter buffer, and adjust the size of the jitter buffer based on the traffic flow characteristics.

* * * * *